(12) United States Patent
Ryu et al.

(10) Patent No.: US 11,648,836 B2
(45) Date of Patent: May 16, 2023

(54) GAS FUEL STORAGE DEVICE FOR VEHICLE

(71) Applicants: Hyundai Motor Company, Seoul (KR); Kia Motors Corporation, Seoul (KR)

(72) Inventors: Bu Yeol Ryu, Gyeonggi-Do (KR); Tac Koon Kim, Seoul (KR); Hyun Do Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 310 days.

(21) Appl. No.: 17/034,354

(22) Filed: Sep. 28, 2020

(65) Prior Publication Data

US 2021/0101475 A1 Apr. 8, 2021

(30) Foreign Application Priority Data

Oct. 8, 2019 (KR) .................. 10-2019-0124271

(51) Int. Cl.
*B60K 15/07* (2006.01)
*B60K 15/03* (2006.01)
*B60K 15/063* (2006.01)

(52) U.S. Cl.
CPC ........ *B60K 15/07* (2013.01); *B60K 15/03006* (2013.01); *B60K 2015/03026* (2013.01); *B60K 2015/03144* (2013.01); *B60K 2015/03453* (2013.01); *B60K 2015/0634* (2013.01); *B60K 2015/0638* (2013.01)

(58) Field of Classification Search
CPC ........... B60K 2015/03118; B60K 2015/03144; B60K 2015/0634; B60K 2015/03256; B60K 2015/03006
See application file for complete search history.

(56) References Cited

U.S. PATENT DOCUMENTS

2013/0264347 A1* 10/2013 Fujita ..................... B32B 3/266
428/36.5
2018/0093563 A1* 4/2018 Matijevich ........... B60K 15/063

FOREIGN PATENT DOCUMENTS

| JP | 2000343959 A | 12/2000 |
| JP | 2004114740 A | 4/2004 |
| JP | 4044768 B2 | 2/2008 |
| KR | 100925937 B1 | 11/2009 |

* cited by examiner

*Primary Examiner* — Andrew T Kirsch
(74) *Attorney, Agent, or Firm* — Fox Rothschild LLP

(57) ABSTRACT

A gas fuel storage device for a vehicle is provided. The device more easily secures a gas fuel storage capacity and prevents interior marketability of the vehicle from deteriorating.

8 Claims, 7 Drawing Sheets

GAS FUEL STORAGE DEVICE FOR VEHICLE

CROSS-REFERENCE TO RELATED APPLICATION

This application claims under 35 U.S.C. § 119(a) the benefit of priority to Korean Patent Application No. 10-2019-0124271 filed on Oct. 8, 2019, the entire contents of which are incorporated herein by reference.

BACKGROUND (a) Technical Field

The present disclosure relates to a gas fuel storage device for a vehicle, and more particularly, to a gas fuel storage device for a vehicle capable of more easily securing a gas fuel storage capacity and preventing interior marketability of the vehicle from deteriorating.

(b) Background Art

Recently, as oil production decreases and global warming accelerates, the interest in natural gas fuel continues to increase as a vehicle fuel to replace gasoline. The natural gas produces fewer pollutants and is more effective in reducing emissions of vehicles than gasoline. The natural gas is compressed to a high pressure and stored in a gas container. When being supplied into an engine, the natural gas is reduced to a working pressure, mixed with air, and then supplied to the engine. For the storage of the natural gas, the gas container that includes a cylinder and a dome integrally formed at both ends of the cylinder is used.

Referring to FIG. 7 of the prior art, when a gas container 1 is mounted on a vehicle, the gas container 1 is disposed on a support body 2 installed in a vehicle body, the gas container 1 is enclosed with two or more belts 3, and then the belt 3 is coupled to the support body 2. Therefore, for the existing gas container, it is necessary to mount a support body, on which the gas container may be mounted, on a vehicle body, and as a result, there is a need to develop and produce the vehicle body.

In addition, the gas container needs to secure an additional 30% or more storage space compared to a gasoline tank to ensure the same cruising range as gasoline. When the gas container is used, since the support body is mounted on the vehicle body, a trunk room or a rear seat space of the vehicle is narrowed, and the interior marketability is reduced.

The above information disclosed in this section is merely for enhancement of understanding of the background of the disclosure and therefore it may contain information that does not form the prior art that is already known in this country to a person of ordinary skill in the art.

SUMMARY

The present disclosure provides a gas fuel storage device for a vehicle capable of more easily securing a gas fuel storage capacity and preventing interior marketability of the vehicle from deteriorating.

In an aspect, a gas fuel storage device for a vehicle may include a case mounted on a lower side part of a vehicle body and disposed under the vehicle body; a partition wall portion disposed in an internal space of the case and partition the internal space into a plurality of storage spaces; a plurality of gas containers disposed one by one in the plurality of storage spaces; and a multi-valve provided outside the case and connected to a pipe portion of the gas container. The gas fuel storage device has the following features.

The multi-valve may include a first valve that discharges a gas fuel stored in the gas container to an engine, a second valve that introduces the gas fuel supplied from an outside of the case into the gas container, and a port that is connected to the pipe portion. The case may include a front casing portion disposed in front of a rear wheel suspension; a rear casing portion disposed behind the rear wheel suspension; and a middle casing portion provided between the front casing portion and the rear casing portion, and a bottom surface of the middle casing portion may be disposed above a bottom surface of the front casing portion and a bottom surface of the rear casing portion by a certain value. A lower part of the middle casing portion may be provided with the rear wheel suspension.

The pipe portion may include a plurality of front pipes that connect between pipe connecting portions provided on upper side parts of the gas containers housed in the front casing portion; a plurality of rear pipes that connect between pipe connecting portions provided on upper side parts of the gas containers housed in the rear casing portion; a middle pipe disposed in the middle casing portion to be connected to the front pipe portion and the rear pipe portion; and a multi-pipe disposed between the middle pipe and the multi-valve to be connected to the middle pipe and the multi-valve. Each of the front pipes may connect between the pipe connecting portions of the gas containers arranged in a line in a front-rear direction in the front casing portion, and each of the rear pipes may connect between the pipe connecting portions of the gas containers arranged in a line in a front-rear direction in the rear casing portion.

The partition wall portion may include a plurality of first diaphragm portions arranged in a left-right direction; and a plurality of second diaphragm portions arranged in a front-rear direction and disposed perpendicular to the first diaphragm portion, and the gas container may be inserted into a storage space enclosed by the first diaphragm portion and the second diaphragm portion to be supported while being into contact with the first diaphragm portion and the second diaphragm portion.

According to the gas fuel storage device for a vehicle in accordance with the present disclosure, it may be possible to more easily secure the gas fuel storage capacity and prevent the indoor room and the trunk room of the vehicle from being reduced compared to the existing gas container.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
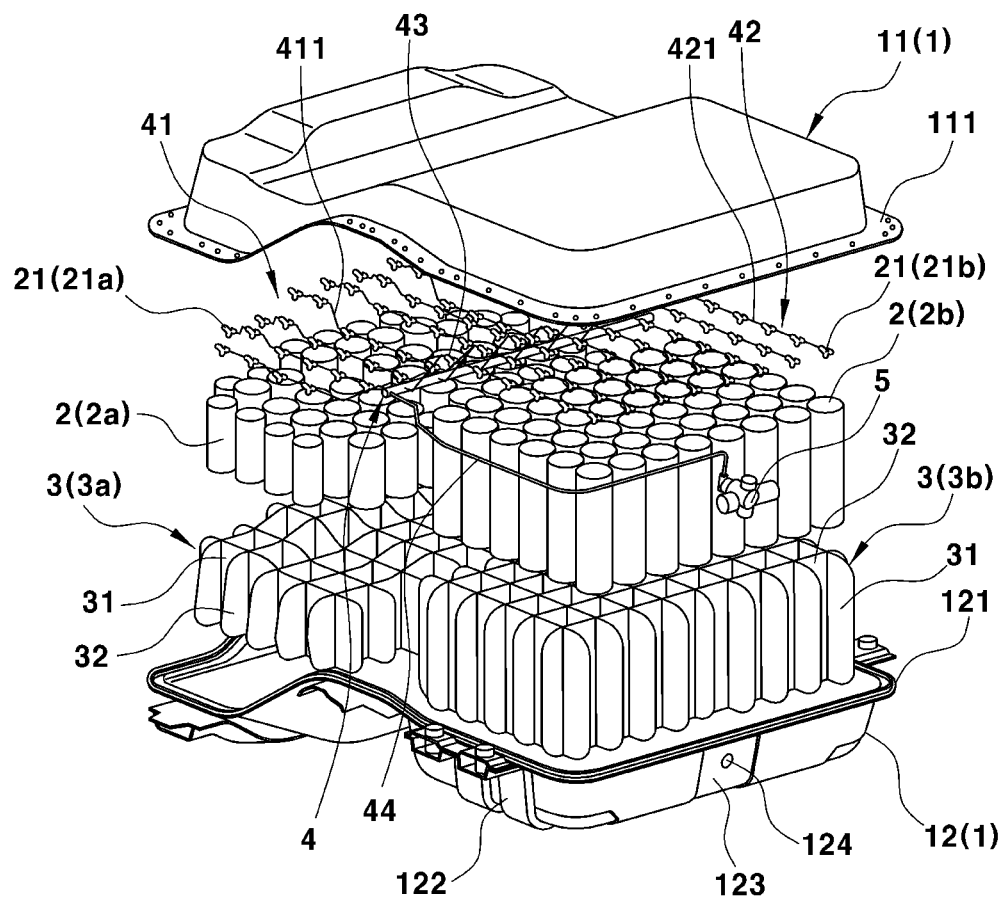
FIGS. 1 and 2 are perspective views showing a gas fuel storage device according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
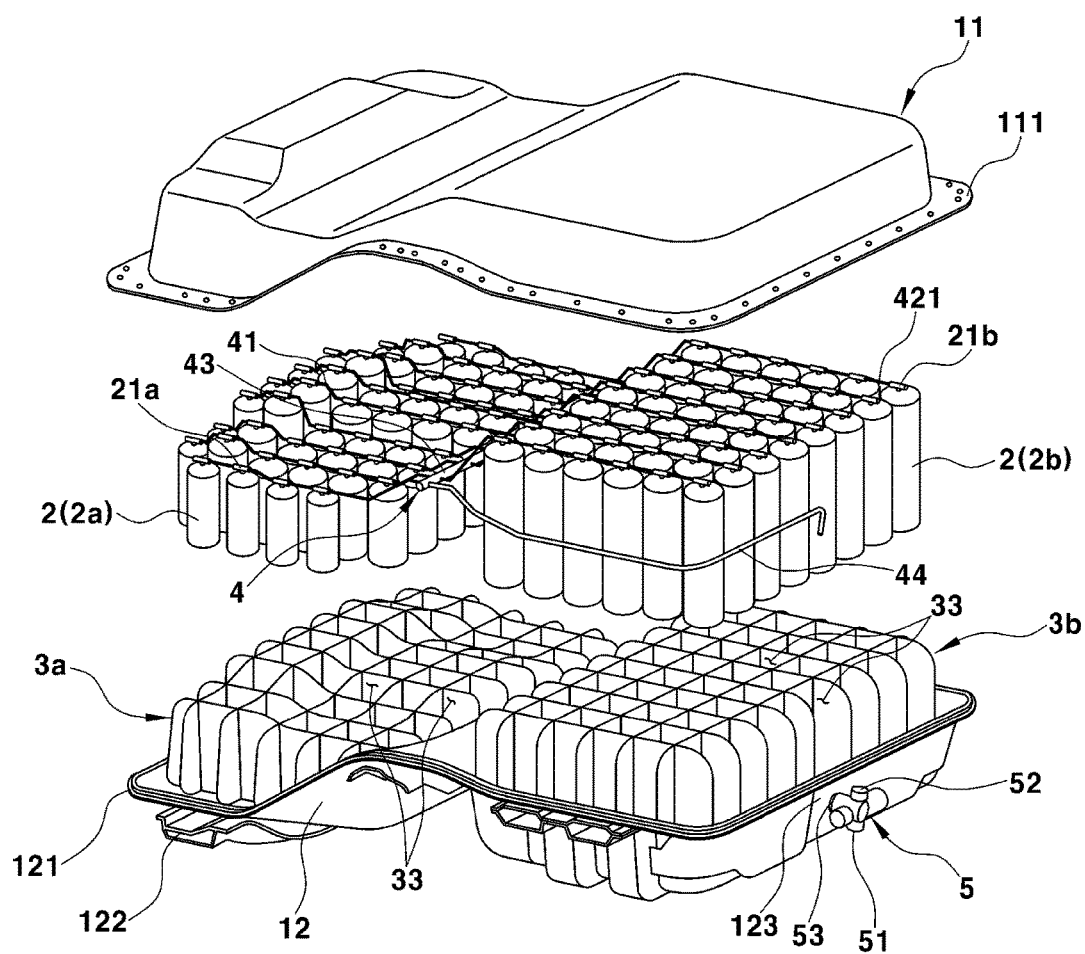
Figure 3:
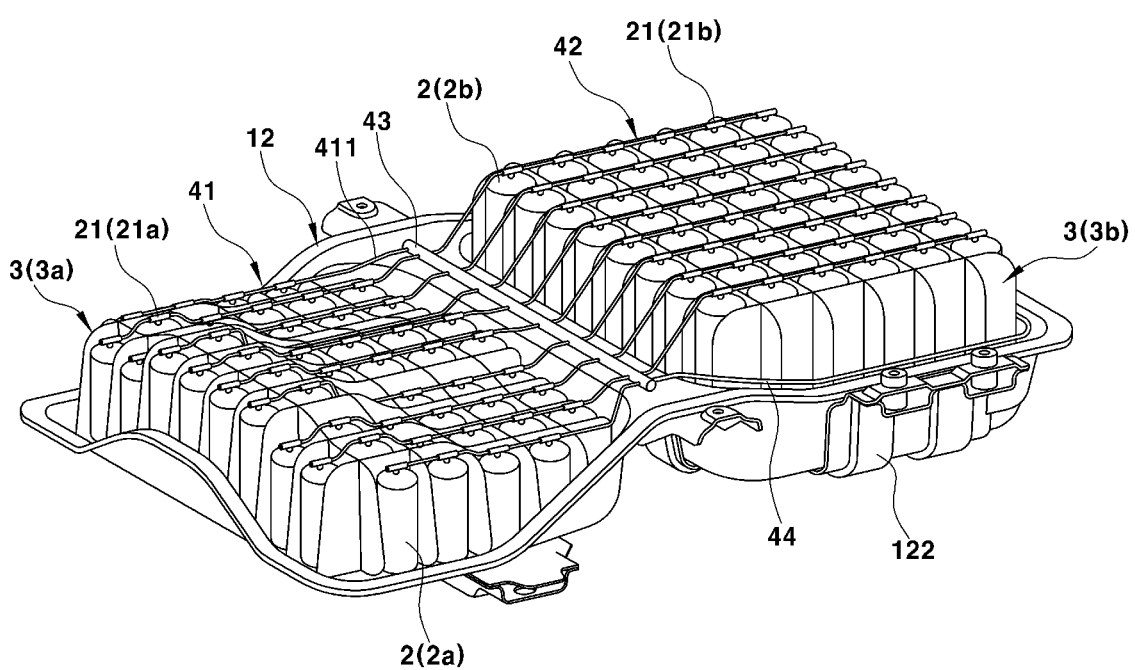
FIG. 3 is a perspective view showing a gas container housed in a lower case according to an exemplary embodiment of the present disclosure.

Hereinafter, the present disclosure will be described to be implemented by those skilled in the art. As shown in FIGS. 1 and 2, a gas fuel storage device of the present disclosure may include a case 1 mounted on a vehicle body, a plurality of gas containers 2 housed in an internal space of the case 1, and a partition wall portion 3 supporting the gas containers 2.

Figure 6:
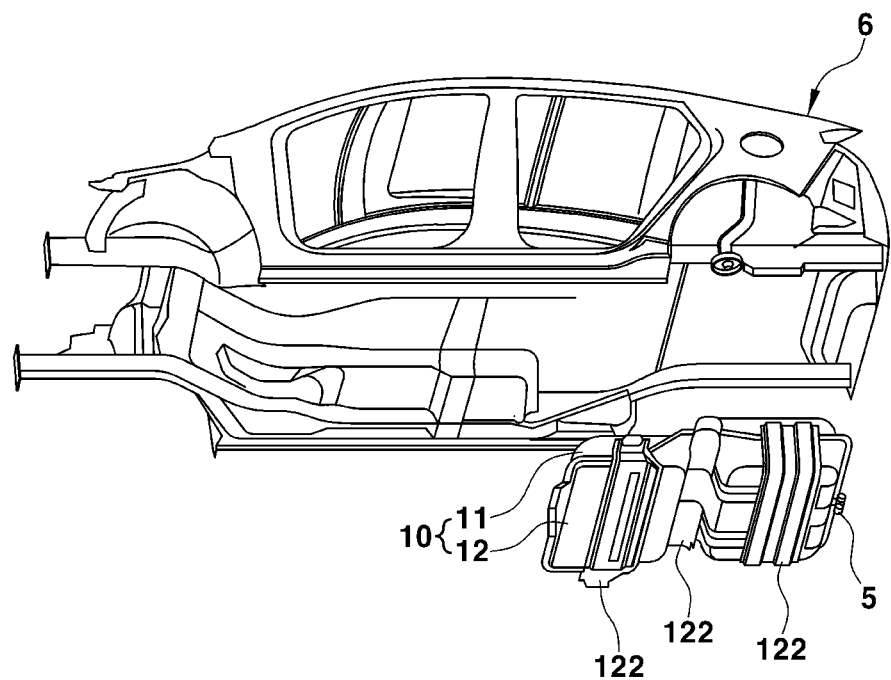
FIG. 6 is a view showing a mounting member of the lower case which is mounted on a lower side part of the vehicle body according to an exemplary embodiment of the present disclosure.
Figure 7:
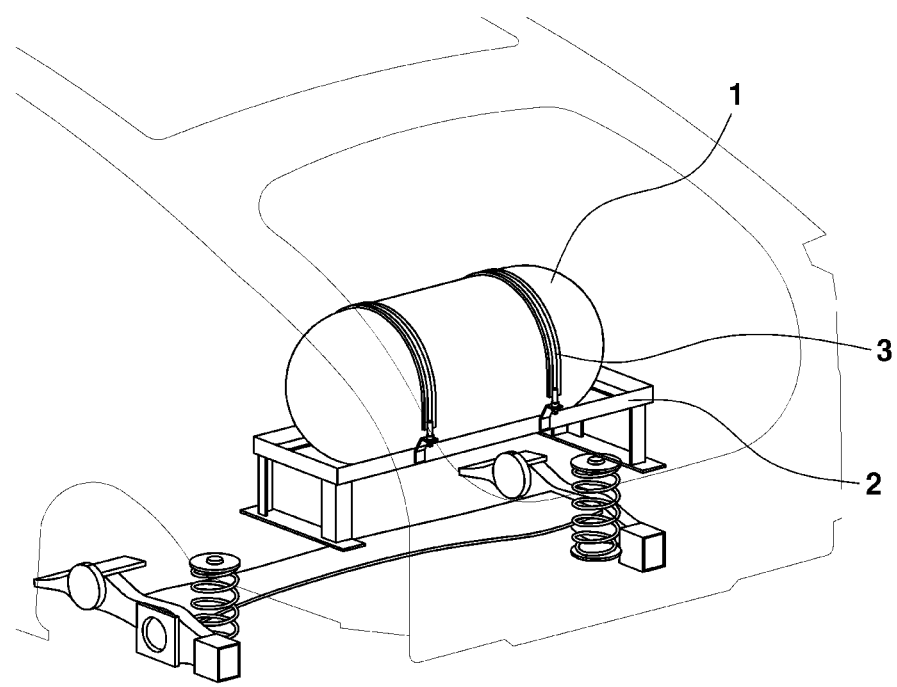
FIG. 7 is a view showing the gas container mounted inside the existing vehicle body according to the prior art.

As shown in FIGS. 1 to 4, the case 1 may have an internal space in which the gas containers 2 may be housed. Specifically, the case 1 may include an upper case 11 and a lower case 12 disposed under the upper case 11. The case 1 may have an internal space enclosed by the upper case 11 and the lower case 12. Referring to FIG. 6, a mounting member 122 fastened to a vehicle body 6 may be provided on an outer side part of the lower case 12. The mounting member 122 may be formed in a bracket shape surrounding the outer side part of the lower case 12.

When the lower case 12 is mounted on a lower side part of the vehicle body 6 by the mounting member 122, the upper case 11 is in contact with the lower side part of the vehicle body 6. Specifically, the lower case 12 may be mounted on a lower side part of a floor panel forming a bottom surface of the vehicle body 6, and an upper side part of the upper case 11 may contact the lower side part of the floor panel. An upper flange 111 fastened to the lower case 12 may be provided at a lower end of the upper case 11. A lower flange 121 fastened to the upper case 11 may be provided at an upper end of the lower case 12. The upper flange 111 may be fastened and fixed to the lower flange 121 in a state in which the upper flange 111 is stacked on an upper side of the lower flange 121.

Figure 4:
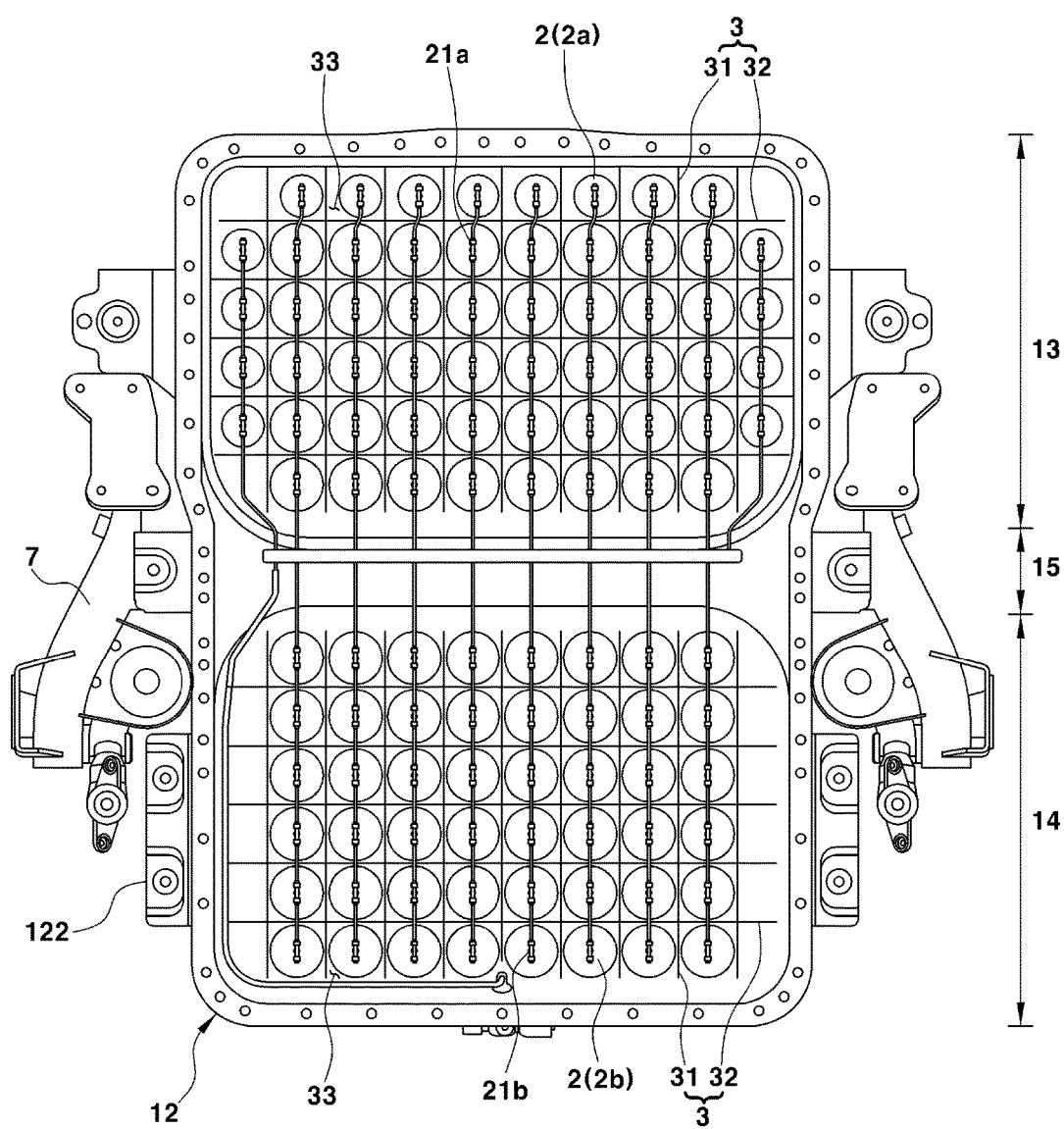
FIG. 4 is a plan view showing the gas container housed in the lower case according to an exemplary embodiment of the present disclosure.
Figure 5:
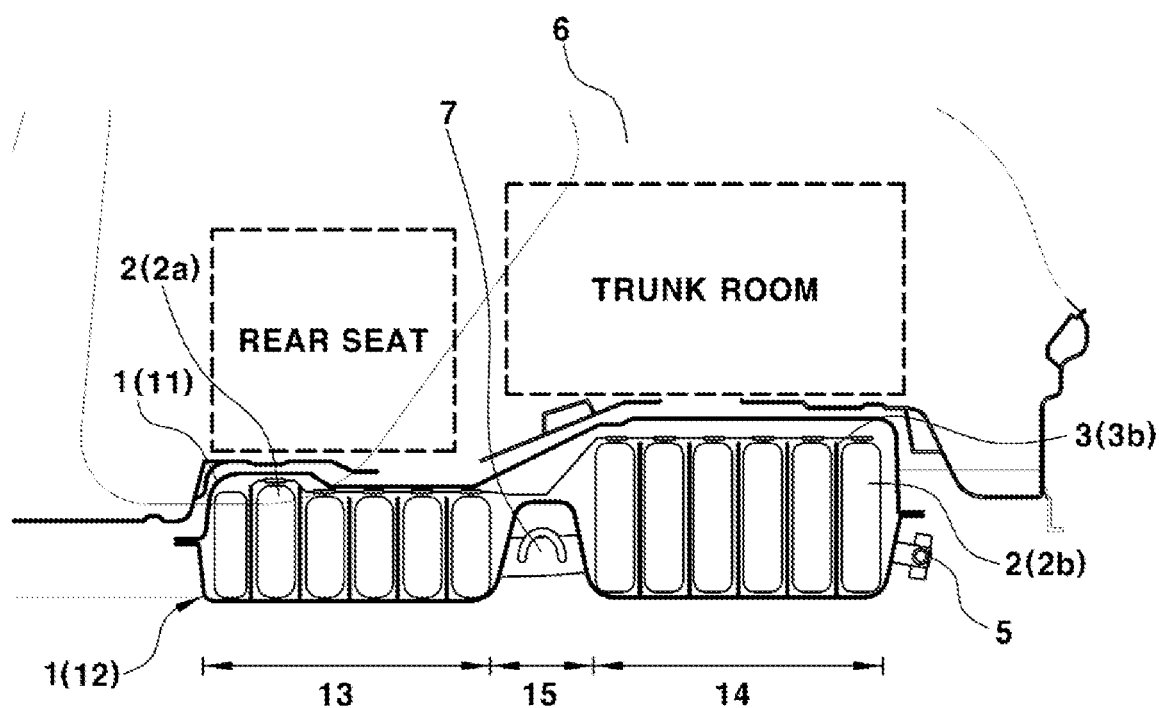
FIG. 5 is a side cross-sectional view showing a gas fuel storage device according to an exemplary embodiment of the present disclosure.

In addition, referring to FIGS. 4 and 5, the case 1 may be divided into a front casing portion 13 and a rear casing portion 14 with respect to a rear wheel suspension 7 mounted on the vehicle body 6. Specifically, when the case 1 is mounted on the vehicle body 6, the case 1 may include a front casing portion 13 disposed in front of the rear wheel suspension 7, a rear casing portion 14 disposed behind the rear wheel suspension 7, and a middle casing portion 15 integrally provided between the front casing portion 13 and the rear casing portion 14.

Gas containers 2a and 2b may be housed in the front casing portion 13 and the rear casing portion 14, respectively. To dispose the rear wheel suspension 7 under the middle casing portion 15, a bottom surface of the middle casing portion 15 may be disposed above a bottom surface of the front casing portion 13 and a bottom surface of the rear casing portion 14 by a certain value or greater. The rear wheel suspension 7 is a suspension mounted between the rear wheel and the vehicle body 6 to isolate vibration transmitted from a road surface. The rear wheel suspension 7 may be disposed in left and right directions of the vehicle body 6 under the middle casing portion 15.

In a typical vehicle, a rear seat is disposed at an upper side in front of the rear wheel suspension and the trunk room is disposed at an upper side behind the rear wheel suspension. Therefore, when the gas fuel storage device is mounted on the vehicle body of an existing vehicle, the rear seat may be disposed on the upper side in front of the rear wheel suspension 7, and the trunk room may be disposed on the upper side behind the rear wheel suspension 7 (see FIG. 5). In addition, the front casing portion 13 may be disposed under the rear seat, and the rear casing portion 14 may be disposed under the trunk room.

The gas container 2 may be filled with a gas (i.e., gas fuel) used as a fuel of a vehicle. The gas fuel may be compressed to a high pressure (e.g., about 200 to 250 bars) and stored in the gas container 2. To maximize a gas fuel storage capacity per unit space in the case 1, the gas container 2 may be disposed vertically in the internal space of the case 1, and a diameter of the gas container 2 may be limited to about 50 mm to 150 mm. The diameter of the gas container 2 may be an outer diameter of the gas container 2. The gas container 2 may be configured to have a structure in which the existing large gas container is reduced in size. In other words, the gas container 2 may be a hermetically sealed container including a cylindrical cylinder and a dome integrally provided on both sides of the cylinder.

An upper end of the gas container 2 may be provided with a pipe connecting portion 21 through which a gas fuel is introduced and discharged. The pipe connecting portion 21 may be configured to include a valve for controlling the introduction and discharge of the gas fuel. To vertically house the gas container 2 in the case 1, the partition wall portion 3 may be disposed in the internal space of the case 1. The partition wall portion 3 may be disposed in the internal space of the case 1 to divide the internal space into a plurality of storage spaces 33. Accordingly, the partition wall portion 3 may be configured as a diaphragm of a grid structure.

Specifically, the partition wall portion 3 may include a plurality of first diaphragm portions 31 arranged in the left and right directions of the vehicle and a plurality of second diaphragm portions 32 arranged in the front and rear directions of the vehicle. The plurality of first diaphragm portions 31 may be arranged in parallel to each other in the left and right directions. The plurality of second diaphragm portions 32 may be arranged in parallel to each other in the front and rear directions. Each second diaphragm portion 32 may be disposed to be perpendicular to the first diaphragm portion 31. By the first diaphragm portion 31 and the second diaphragm portion 32, the internal space of the case 1 may be partitioned into the plurality of storage spaces 33. The storage space 33 may be a space having a rectangular cross section.

The gas container 2 may be housed one by one in the plurality of storage spaces 33. The gas container 2 inserted into the storage space 33 may be supported while being into contact with a first diaphragm portion adjacent to the gas container 2 among the plurality of first diaphragm portions 31 and a second diaphragm portion adjacent to the gas container 2 among the plurality of second diaphragm portions 32. Therefore, the flow of the gas container 2 may be minimized even when driving.

These partition wall portions 3 may be disposed in the front casing portion 13 and the rear casing portion 14, respectively. In particular, the partition wall portion 3 disposed in the front casing portion 13 may be a front partition wall portion 3a, and the partition wall portion 3 disposed in the rear casing portion 14 may be a rear partition wall portion 3b. To connect the gas container 2 housed in the internal space of the case 1 to a gas supply device, an engine, and the like provided outside the case 1, one side of the case 1 may include a multi-valve 5 connected to a pipe portion 4 of the gas container 2.

Referring to FIGS. 2 and 5, the multi-valve 5 may be disposed outside the case 1. Specifically, the multi-valve 5 may be disposed to protrude from the rear side part of the lower case 12. A position of the multi-valve 5 may be changed as necessary. In other words, the multi-valve 5 may be disposed anywhere in the case 1 regardless of the upper side part, the lower side part, the side part, and the like of the case 1.

The multi-valve 5 may be configured to include a first valve 51 that discharges a gas fuel stored in the gas container 2 to the engine, a second valve 52 that introduces the gas fuel supplied from the outside of the case 1 into the gas container 2, and a port 53 that is connected to a multi-pipe 44 of the pipe portion 4. In other words, the multi-valve 5 may be configured to include the first valve 51 that may be connected to the engine, the second valve 52 that may be connected to an external gas supply device, and the port 53 that may be connected to the gas container 2. Both the first valve 51 and the second valve 52 may be connected to the multi-pipe 44 through the port 53.

The rear side part of the lower case 12 may include a mounting portion 123 on which the port 53 is assembled. The port 53 may be installed in the mounting portion 123 to penetrate the rear side part of the lower case 12. Accordingly, the mounting portion 123 may be provided with an aperture 124 into which the port 53 may be fitted.

Referring to FIGS. 1 to 4, the pipe portion 4 may include a front pipe portion 41, a rear pipe portion 42, and a middle pipe 43 in addition to the multi-pipe 44. The front pipe portion 41 may be connected to all of the gas containers (hereinafter, referred to as "front gas containers") housed in the front casing portion 13. In particular, the front pipe portion 41 may be connected to all of the pipe connecting portions 21a provided on the upper side part of the front gas container 2a. The front pipe portion 41 enables gas transfer between the pipe connecting portions 21a. The front pipe portion 41 may be connected to the middle pipe 43 to enable gas transfer between the front pipe portion 41 and the middle pipe 43.

Referring to FIG. 4, the front gas container 2a may be arranged in a plurality of rows in the front casing portion 13. In addition, the front pipe portion 41 may be configured as a front pipe 411 for connecting between a series of gas containers arranged in the front-rear direction in the front gas container 2a. Specifically, the front pipe 411 may connect between the pipe connecting portions 21a of the front gas container 2a. The front gas container 2a may be connected to the gas containers arranged in a line in the front-rear direction by one front pipe 411. The front pipe 411 may be simultaneously connected to the pipe connecting portion 21a and the middle pipe 43.

The rear pipe portion 42 may be connected to all of the gas containers (hereinafter, referred to as "rear gas containers") housed in the rear casing portion 14. In particular, the rear pipe portion 42 may be connected to all of the pipe connecting portions 21b provided on the upper side part of the rear gas container 2b. The rear pipe portion 42 enables gas transfer between the pipe connecting portions 21b. The rear pipe portion 42 may be connected to the middle pipe 43 to enable gas transfer between the rear pipe portion 42 and the middle pipe 43.

Referring to FIG. 4, the rear gas container 2b may be arranged in a plurality of rows in the rear casing portion 14. In addition, the rear pipe portion 42 may be configured as a rear pipe 421 for connecting between a series of gas containers arranged in the front-rear direction in the rear gas container 2b. Specifically, the rear pipe 421 may connect between the pipe connecting portions 21b of the rear gas container 2b. The rear gas container 2b may be connected to the gas containers arranged in a line in the front-rear direction by one rear pipe 421. The rear pipe 421 may be simultaneously connected to the pipe connecting portion 21b and the middle pipe 43.

The middle pipe 43 may be disposed in the middle casing portion 15 and may be connected to the front pipe portion 41 and the rear pipe portion 42. In addition, the middle pipe 43 may be connected to the multi-pipe 44. In addition, the multi-pipe 44 may be connected to the port 53 of the multi-valve 5. In other words, the multi-pipe 44 may be disposed between the middle pipe 43 and the multi-valve 5 to be connected to the middle pipe 43 and the port 53 of the multi-valve 5.

In the gas fuel storage device configured as described above, since the case 1 may be mounted on the lower side part of the vehicle body 6, the gas storage capacity may be more easily secured than the existing gas container, the internal space of the vehicle body 6 need not be provided with the support body on which the existing large gas container is mounted, and the internal space and the trunk room of the vehicle may be prevented from being reduced due to the case 1, and thus, the interior marketability of the vehicle may be prevented from deteriorating.

In addition, the gas fuel storage device may utilize the existing battery case for an electric vehicle without newly designing the case 1, and thus the investment cost may be reduced. For example, a battery power terminal is typically installed at the rear side part of the battery case. Accordingly, the multi-valve 5 may be installed on a rear side part of a battery case in which the power terminal is installed, without separately modifying the battery case. In addition, the gas fuel storage device has an advantage that the withstand pressure stability of the gas container increases as compared with the case of using the existing large gas container, by using the gas container 2 in a small size.

Although the exemplary embodiments of the present disclosure have been described in detail hereinabove, the scope of the present disclosure is not limited thereto, but may include several modifications and alterations made by those skilled in the art using a basic concept of the present disclosure as defined in the claims.

What is claimed is:

1. A gas fuel storage device for a vehicle, comprising:
   a case mounted on a lower side part of a vehicle body and disposed under the vehicle body;
   a partition wall portion disposed in an internal space of the case and partition the internal space into a plurality of storage spaces;
   a plurality of gas containers disposed one by one in the plurality of storage spaces; and
   a multi-valve provided outside the case and connected to a pipe portion of the gas container,
   wherein the partition wall portion includes:
      a plurality of first diaphragm portions arranged in a left-right direction; and
      a plurality of second diaphragm portions arranged in a front-rear direction and disposed perpendicular to the plurality of first diaphragm portions;
   wherein each of the plurality of gas containers is inserted into a respective storage space of the plurality of storage spaces enclosed by respective ones of the plurality of first diaphragm portions and the plurality of second diaphragm portions to be supported while being into contact with the respective ones of the plurality of first diaphragm portions and the plurality of second diaphragm portions; and
   wherein a length of each of the plurality of gas containers is vertically disposed within its respective storage space.

2. The gas fuel storage device for a vehicle of claim 1, wherein the multi-valve includes a first valve that discharges a gas fuel stored in the plurality of gas containers to an engine, a second valve that introduces the gas fuel supplied from an outside of the case into the plurality of gas containers, and a port that is connected to the pipe portion.

3. The gas fuel storage device for a vehicle of claim 1, wherein the case includes:
   a front casing portion disposed in front of a rear wheel suspension;
   a rear casing portion disposed behind the rear wheel suspension; and
   a middle casing portion provided between the front casing portion and the rear casing portion, and
   a bottom surface of the middle casing portion is disposed above a bottom surface of the front casing portion and a bottom surface of the rear casing portion by a certain value.

4. The gas fuel storage device for a vehicle of claim 3, wherein the rear wheel suspension is disposed under the middle casing portion.

5. The gas fuel storage device for a vehicle of claim 3, wherein the pipe portion includes:
   a plurality of front pipes that connect between pipe connecting portions provided on upper side parts of the plurality of gas containers housed in the front casing portion;
   a plurality of rear pipes that connect between pipe connecting portions provided on upper side parts of the plurality of gas containers housed in the rear casing portion;
   a middle pipe disposed in the middle casing portion to be connected to the front pipe portion and the rear pipe portion; and
   a multi-pipe disposed between the middle pipe and the multi-valve to be connected to the middle pipe and the multi-valve.

6. The gas fuel storage device for a vehicle of claim 5, wherein each of the front pipes connects between the pipe connecting portions of the plurality of gas containers arranged in a line in a front-rear direction in the front casing portion.

7. The gas fuel storage device for a vehicle of claim 5, wherein each of the rear pipes connects between the pipe connecting portions of the plurality of gas containers arranged in a line in a front-rear direction in the rear casing portion.

8. The gas fuel storage device for a vehicle of claim 1, wherein the case includes an upper case and a lower case fastened to a lower side of the upper case, and the lower case includes a mounting member fastened to the vehicle body.

* * * * *